United States Patent [19]

DuBois

[11] 4,206,382
[45] Jun. 3, 1980

[54] GLASS-TO-GLASS SEALING METHOD WITH CONDUCTIVE LAYER

[75] Inventor: Richard DuBois, North Caldwell, N.J.

[73] Assignee: Wagner Electric Corporation, Parsippany, N.J.

[21] Appl. No.: 918,084

[22] Filed: Jun. 22, 1978

[51] Int. Cl.² ............................................. H01J 5/50
[52] U.S. Cl. ................................. 313/331; 313/244
[58] Field of Search ............... 313/219, 220, 244, 291, 313/326, 331, 512

[56] References Cited

U.S. PATENT DOCUMENTS

| | | | |
|---|---|---|---|
| 3,668,466 | 6/1972 | Shimada | 315/169 |
| 3,837,724 | 9/1974 | Haberland et al. | 313/220 |
| 4,004,186 | 1/1977 | Bylander | 315/167 |
| 4,113,896 | 9/1978 | Keiner et al. | 313/220 |
| 4,132,920 | 1/1979 | Kobayakawa et al. | 313/220 |

*Primary Examiner*—Alfred E. Smith
*Assistant Examiner*—Robert E. Wise
*Attorney, Agent, or Firm*—Eyre, Mann, Lucas & Just

[57] ABSTRACT

A glass-to-glass seal with an intervening layer of metal oxide is made using a frit containing a high lead content and a metallic nucleating agent. The metal oxide may optionally be used to provide conductive paths through the seal without embedded metallic conductors.

12 Claims, 6 Drawing Figures

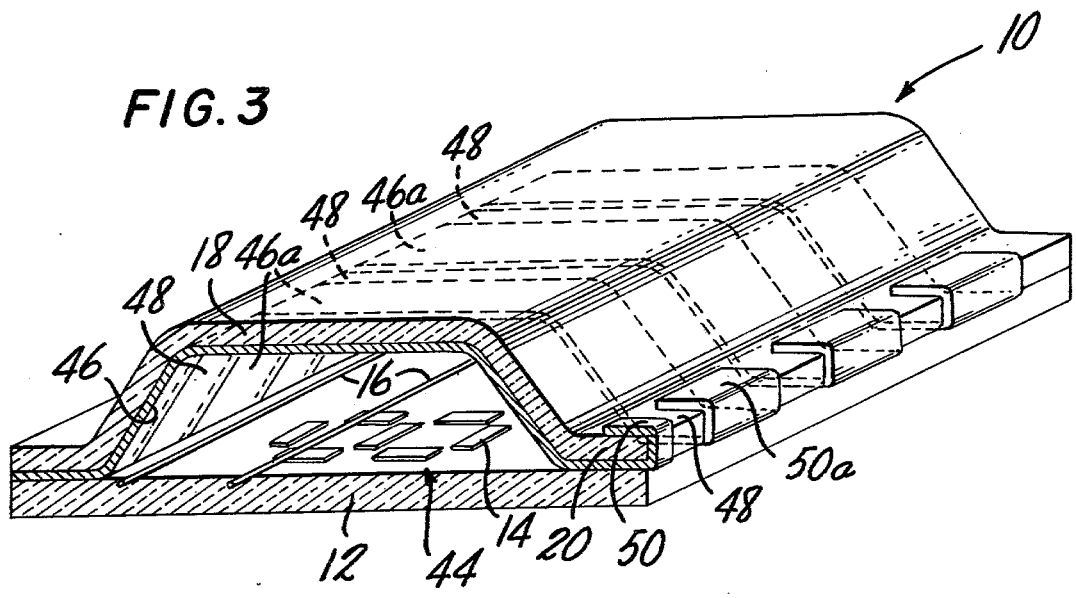
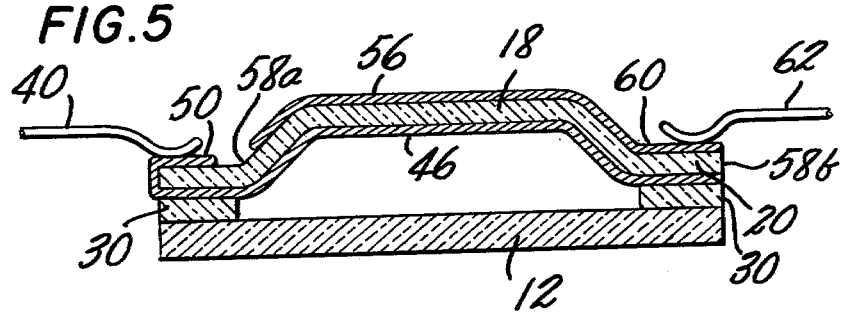
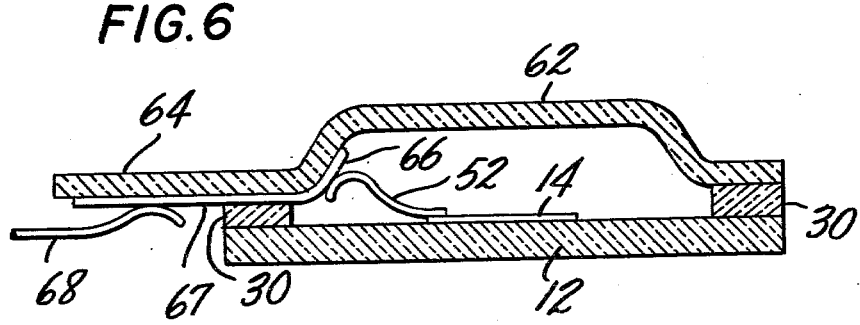

GLASS-TO-GLASS SEALING METHOD WITH CONDUCTIVE LAYER

BACKGROUND OF THE INVENTION

Fluorescent display devices, used in calculators and other logic-driven systems, utilize segmented phosphor-covered electrodes which are excited into optical emission by the impingement of thermoelectrons emitted by a low temperature electrically heated filament in a vacuum or by electrically excited ions in a gaseous environment. The electrodes are usually mounted upon a flat glass or ceramic substrate and the electrodes and filament are enclosed in a concave cover, usually of glass. The cover typically has a peripheral flange adapted to face-to-face mating with the substrate and is usually hermetically sealed thereto using a low-temperature frit forming a sealed enclosure between the cover and the substrate. The sealed enclosure is conventionally evacuated or gas filled, tipped off and gettered by means well known in the art.

At the low interelectrode accelerating voltages typical in fluorescent display devices, external and internal electrostatic fields can have a significant and varying effect on the illumination of the phosphor coated electrodes. This effect was recognized and countered in U.S. Pat. No. 3,584,252 using a screen around part of the circumference inside a vacuum tube. U.S. Pat. Nos. 4,004,186 and 3,668,466 teach the use of a layer of transparent conductive coating inside the transparent cover plate to shield the interior of the fluorescent display device from external electrostatic fields.

The transparent conductive coating using, for example, SnO or InO, applied to the inside of the cover plate by vapor deposition, chemical deposition or sputtering.

Heretofore, in order to obtain a reliable seal between the flange on the cover plate and the substrate, it was universally believed that the flange on the cover plate which mated with the substrate could not be coated with the transparent conductive coating. Consequently, expensive masking or removal procedures were required to either protect the flange area from being coated or to remove the coating from this region after coating.

In some cases, such as shown in the referenced patents, it is desirable to make electrical contact between external circuits and the conductive coating. This has conventionally been accomplished by providing a metallic conductor through the hermetic seal and a contact piece, usually resiliently held in mechanical and electrical contact with the conductive coating, within the sealed enclosure.

A prevalent failure mode of fluorescent display devices of the type described in the preceding occurs at the peripheral seal in the vicinity of the metallic conductors piercing the seal. These failures may be discovered immediately upon manufacture, which increases scrap at the most costly point in the assembly sequence, or it may develop in use, which damages the reputation of the manufacturer as well as increasing the cost of a warranty program.

Hermetic seal failures are approximately proportional to the number of metallic conductors piercing the seal. It is therefore desirable to reduce the number of metallic conductors piercing the seal as much as possible.

SUMMARY OF THE INVENTION

The applicant has developed a method of assembly of vacuum fluorescent devices which eliminates the problems of the prior art. The applicant's invention eliminates the need to clean the metallic oxide from the sealing flange of the cover plate and also permits completely eliminating metallic conductors piercing the hermetic seal for making contact with the conductive metallic oxide on the inside of the cover plate.

The applicant has discovered that a low-temperature melting-point frit, containing a high percentage of lead plus a trace of nucleating agent, makes a satisfactory hermetic seal to a metal-oxide layer deposited on the sealing flange of the glass over plate of a vacuum fluorescent device.

In addition, the applicant has discovered that the metal oxide layer in the sealing flange retains its conductive properties in the sealing flange after sealing. The applicant takes advantage of this fact to make electrical contact with the metal oxide layer inside the sealed enclosure from outside the sealing flange without adding a metallic lead through the hermetic seal. The electrical contact is achieved by making contact with the metal oxide film outside the sealing flange and taking advantage of the conductive film on the sealing flange to provide electrical continuity between the inside and outside of the sealed enclosure.

The surface resistivity of the metal oxide coating, defined as the resistance between opposite edges of a surface film 1 cm square, measured by determining the resistance between two straight conductors 1 cm apart, pressed upon the surface of a slab of the material, may be made almost any desired value by appropriate choice of material and thickness. When tin oxide is used, for example, surface resistivities of 2K to 20K ohms are usually provided. In one example, a tin oxide coating having a surface resistivity of 2K ohms on the inner surface of te cover plate was found to have a surface resistivity of 2K ohms through the seal after sealing by conventional means.

The values of surface resistivity are low enough for making connection through the sealing flange to an electrostatic lens which carries moderate current. For connection to electrodes carrying higher currents, for example filaments carrying tens to hundreds of milliamperes, these values of surface resistivity would probably produce unacceptable voltage drops and $I^2R$ heating.

Lower surface resistivity can be readily achieved with thicker coatings of metal oxide. For example, using tin oxide, surface resistivity of 1 or 2 ohms is readily achievable. The coating thickness to achieve very low values of surface resistivity is in the range which interferes sufficiently with transparency that utility may be impaired if the thick coating is uniformly deposited over the viewing area of the cover plate. Selective masking and heavier coating of metal oxide may be employed in selected areas outside the viewing area with thinner, more transparent coating in the viewing area to permit making even high-current connections to internal electrodes without using metal leads through the seal.

When the conductive film covers the entire inner surface of the cover plate and is connected to a controlled voltage it establishes and controls a three-dimensional electrostatic field within the enclosure whose space distribution is analytically determinable by methods well known in the art given the geometry of the device and the location and voltages on the electrodes. By controlling the voltage on the conductive film from the exterior of the fluorescent display device through the film on the sealing flange, the applicant has been able to improve the uniformity of the illumination of the phosphor on the electrodes and also to control illumination and extinguishment of the phosphor.

In the particular case of a vacuum fluorescent device in which positively charged phosphor-coated anodes on a glass substrate are illuminated by impingement of thermal electrons emitted by a heated filament, the applicant has discovered that placing a voltage of about 12 volts on the electrostatic lens improves the uniformity of illumination of the anodes. When a voltage of 25 volts is applied to the electrostatic lens, the illumination is effectively extinguished. After about 20 milliseconds with this voltage on the electrostatic lens, the illumination reasserts itself. Although the applicant has no intention of being limited to a particular theory of operation, it is conjectured that, during illumination, the dielectric substrate surrounding the anodes is bombarded with electrons and becomes negatively charged. When the voltage on the electrostatic lens is changed to the extinguishing voltage, the residual negative charge on the substrate contributes to repelling electrons from the anodes. The residual negative charge on the substrate bleeds off sufficiently within a few tens of milliseconds to permit the anode glow to resume. Thus, in a static situation, the anode glow resumes after a brief interval of extinguishment and remains illuminated.

In a dynamic on-off method of operation, advantage can be taken of the momentary extinguishment described in the preceding.

In one type of popular vacuum fluorescent device, a plurality of changeable indicia are formed side-by-side on the dielectric substrate of the vacuum fluorescent device. Corresponding segments of each of the anodes in the indicia are connected together and thus are simultaneously energized. Foraminous grids, located between the filament and the anodes making up each character are energized or deenergized in sequence whereby only one character is illuminated at any other time and all of the remaining of the plurality of indicia are maintained extinguished. This process is repeated at the rate of suitably one hundred times per second whereby each of the characters is illuminated one hundred times per second and is maintained extinguished while each of the other characters in turn is illuminated. At this operating rate, the applicant has discovered that he is able to maintain the phosphor extinguished for the entire period between illuminations by substituting separated electrostatic lenses on the cover plate over the characters and eliminate the foraminous grids between the filament and the anode segments of each character.

As demonstrated in the preceding, an electrostatic lens can be formed by the coating of conductive metal oxide on the inside of the cover plate. In addition, by selectively shielding the inside of the cover plate for deposition of the conductive metal oxide, independent islands of conductive metal oxide can be deposited upon the inside of the cover plate and, the shielding can be continued beyond the sealing flange to provide conductive contact with the islands inside the sealed enclosure from outside the sealed enclosure without using metallic leads piercing the seal. Thus, multiplexing can be performed without providing either a foraminous grid between the filament and the anodes or providing leads through the seal. Consequently, a much less costly assembly is achievable. In addition, the elimination of the glass-to-metal seals for grids significantly reduces device failures due to inadequate seals at manufacture and also improves the service life of the devices. Also, the elimination of a grid between the filament and the anode segments permits the reduction in overall height of the device.

In a further embodiment of the present invention, transparent conductive layers are deposited on both the inside and the outside of the cover plate and are independently energized.

BRIEF DESCRIPTION OF THE DRAWINGS

FIG. 3 shows a perspective cross sectional view of a fluorescent display device employing segmented conductive layers inside the cover plate.

FIG. 5 shows a further embodiment of the invention in which a first conductive layer inside the cover plate is electrically connected to external control by an extension of the conductive layer through the seal and a second conductive layer on the outside of the cover plate opposite the first layer provides a second means of influencing the operation of the device.

FIG. 6 shows an embodiment of the invention in which the cover plate flange extends beyond the substrate to provide direct contact with the conductive layer on the lower surface of the flange.

DETAILED DESCRIPTION OF THE PREFERRED EMBODIMENT

Figure 1:
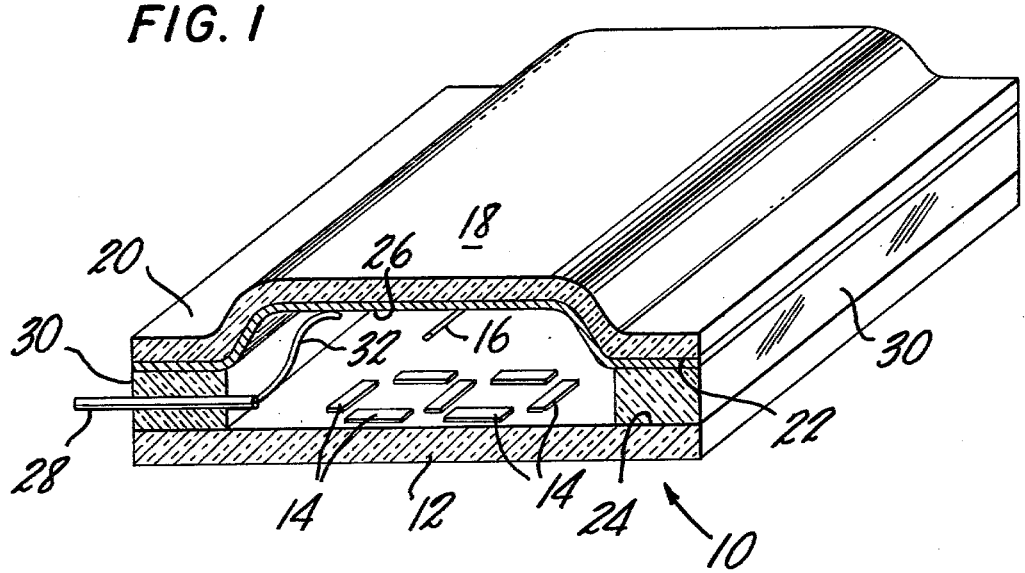
FIG. 1 shows a perspective cross section of a fluorescent display device embodying the teachings of the present invention.

Referring now to FIG. 1, a vacuum fluorescent display device according to the present invention as shown generally at 10 is shown. Although a vacuum fluorescent display device 10 is employed to illustrate the invention, it is to be understood that the invention equally applies to gas-type fluorescent display devices. A substrate 12, preferably of glass has deposited thereon a plurality of phosphor coated segments 14 which may be selectively energized to serve as glowing anodes in the display device 10. Means, not shown, are used to control the electric charge on the segments 14 whereby the desired pattern of illumination and extinguishment may be set up to produce an illuminated character. A plurality of characters may be disposed on the substrate 12. A filament 16 for emitting thermoelectrons may be disposed over the segments. Other elements, not shown, such as grids disposed between the filament 16 and segments 14 or above the filament 16 may also be employed without departing from the spirit of the present invention.

A transparent cover plate 18, preferably of glass has a peripheral flange 20 with a planar sealing surface 22 adapted to plane contact with a mating surface 24 on the perimeter of the substrate 12.

As previously described, a conductive transparent coating, which may be of any satisfactory material but is preferably a metal oxide such as SnO, InO or SbO, but most preferably SnO, is coated in a layer 26 on the inside of the cover plate 18 and the planar sealing surface 22. The layer 26 may be deposited on the cover plate 18 by any convenient method such as vapor deposition, chemical deposition, or sputtering. No care need be taken to prevent coating of the planar sealing surface 22 by the material forming the layer 26 of metal oxide.

A metallic lead 28, which may be directly or indirectly attached to electrical elements such as segments 14 or filament 16 within the sealed enclosure extends outward between the planar sealing surface 22 and mating surface 24 to provide external electrical connection to the elements within the sealed enclosure.

A stripe of frit 30 extends completely around the cover plate 18 between the peripheral flange 20 and the planar sealing surface 22. The stripe of frit 30 is a special low-temperature glass which is melted by baking the display device including the substrate 12, cover plate 18 and internal elements at about 475° C. and thereby melting the stripe of frit 30 and bonding the cover plate 18 to the substrate 12. This also encapsulates and hermetically seals the lead 28 between the peripheral flange 20 and the planar sealing surface 22.

By using a frit having a lead content of from 20% to 60% and including a metallic nucleating agent selected from the group consisting of zinc and titanium, a satisfactory seal is made including the layer 26 of metal oxide between the stripe of frit 30 and the planar sealing surface 22 of the cover plate 18.

A contact piece 32 may be connected to one of the leads 28 and make contact with the conductive layer 26. The allows control of the potential of the conductive layer 26 from outside the display device. The contact piece 32 is preferably spring metal urged into resilient contact with the conductive layer.

Figure 2:
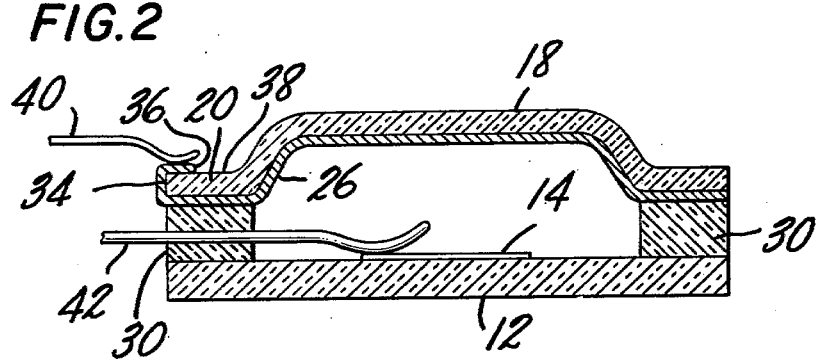
FIG. 2 shows a cross section of a fluorescent display device in which a conductive coating inside the cover plate is placed in electrical contact with an external contact piece using the conductive layer through the seal.

Referring now to FIG. 2, an embodiment of the invention is shown which eliminates the requirement for the lead 28 and contact piece 32 to provide contact with the layer 26.

The layer 26 is continued to the outer edge 34 of the peripheral flange 20 and may optionally be continued as an overlapping layer 36 on the upper surface 38 of the peripheral flange 20. An external contact piece, which may be part of a socket, not shown, is pressed into contact with the overlapping layer 36. As previously explained, this external contact provides electrical continuity to the layer 26 on the inside of the cover plate. Alternatively, the external contact piece 40 may be placed in contact with the overlapping layer 36 covering the outer edge 34 of the peripheral flange 20. A lead 42 may be provided through the frit 30 to make electrical contact with internal elements in the device such as the segment 14. Note that the lead 28 piercing the hermetic seal in FIG. 1 to provide electrical contact with the layer 26 is eliminated in this embodiment. Thus, the electrostatic lens formed by the layer 26 inside the cover plate 18 is controllable from outside the sealed enclosure without the necessity of providing metallic leads through the seal.

Referring now to FIG. 3, there is shown an embodiment of the invention which permits the use of segmented areas of conductive layer inside the cover plate 18 without requiring metallic leads for providing contact with the segmented layers.

The fluorescent display device 10 is a plurality of characters 44 such as the well known 7 segment numeric display which, by energizing selected ones of the 7 segments, can provide a stylized representation of any numeral from 0 to 9. Only one character 44 is shown on the substrate but it is to be understood that a plurality of such characters 44 are spaced apart side by side on the substrate 12.

A segmented layer 46 of conductive material such as tin oxide is deposited on the inside of the cover plate 18 over each of the characters. A segmented layer 46a over the adjacent character, not shown, is isolated from layer 46 by an insulating gap 48 as shown in dashed line. The segmented layers 46, 46a may be continued through the seal and provide an overlapping layer 50, 50a on the top of the peripheral flange 20. The gap 48 is continued through the seal and separates the overlapping layers 50, 50a thus making segmented layer 46 electrically isolated from segmented layer 46a. Separate contact pieces, not shown, may be placed in contact with the overlapping layers 50 and 50a for independent control of the voltage on the segmented layers 46 and 46a. In this manner, the segmented layer 46 may influence the electric field in the vicinity of its associated character 44 while the segmented layer 46a may influence the electric field in the vicinity of its character, hidden by cover plate 18.

The insulating gap 48 may be formed by any means known in the art such as by masking the cover plate 18 before deposition of the segmented layers 46, 46a or a single conductive layer may be deposited upon the cover plate and the gap 48 may be created by chemical or mechanical cleaning or etching.

Figure 4:
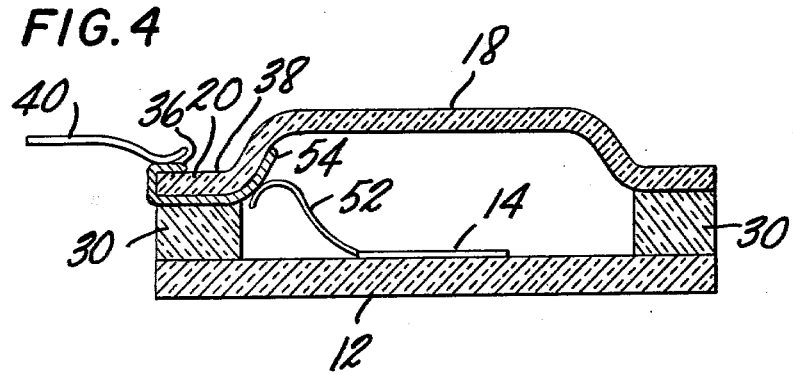
FIG. 4 shows a cross section of a fluorescent display device in which a conductive layer through the seal provides electrical access to other elements inside the sealed enclosure.

Electrical control of other elements inside the vacuum fluorescent display device may also be achieved using conductive layers through the seal as shown in FIG. 4.

One of the internal elements in the vacuum fluorescent display device, for example, segment 14, may be energized using a contact piece 52 which makes contact with a contact region 54 of conductive metal oxide coated on the inside of the cover plate 18. As in previous embodiments, the coating is continuous to an overlapping layer 36 which is in contact with an external contact piece 40. Thus, external electrical control of the segment 14 is achievable without providing metallic leads piercing the sealed enclosure.

A further embodiment of the invention is shown in FIG. 5. An inner layer 46 of transparent conductive metal oxide, for example, one of the segmented layers 46 as shown in FIG. 3, is coated on the inside of the cover plate 18. The overlapping layer 50 and contact piece provide external control of the voltage on the segmented layer 46. An outside layer 56 of transparent conductive metal oxide, which may be of the same type as the inside layer 46, is coated over the outside of the cover plate 18 on the opposite side from the inside layer 46. Gaps 58a and 58b electrically isolate the outside layer 56 from the inside layer 46 and permit independent control of these two layers. The outside layer 56 may optionally overlap peripheral flange 20 to form a contact area 60 to which electrical contact is made by a contact piece 62.

The outside layer 56 is not necessarily coextensive with the inside layer 46. In one embodiment of the invention, the outside layer is a single layer overlapping a plurality of inside segmented layers 46, 46a. The outside layer may be uniformly energized to produce, in conjunction with other elements, a predetermined electric field within the display device. The inside layers 46, 46a may be independently controlled to perform other functions, for example aiding or opposing the electrostatic field established by the outside layer 56.

A further embodiment of the invention is shown in FIG. 6. A cover plate 62 has at least one extended flange 64 which extends beyond the perimeter of the substrate 12. A contact region 66 within the enclosure is contiguous through the seal and onto the lower surface of the extended flange 64 to form an external contact region 67 which may be contacted by a contact piece 68. This embodiment has the advantage over the embodiments shown in FIGS. 2–5 in that the conductive layer is not required to extend around the edge of the flange where it might be worn off or damaged. In addition, the extended flange with its external contact region may be employed as a male portion of a connector for insertion into the female portion of a connector (not shown) which contains one or a plurality of contact pieces 68.

It would be clear to one skilled in the art in the light of FIG. 6 and the preceding disclosure that the use of an extended flange and external contact region on a single surface of the extended flange is not limited to the control of voltage to display segments 14 but may be used to provide electrical connection to any suitable type of apparatus within or without the device including, but not limited to, segments, electrostatic lenses, filaments, screens, antielectrification layers, or other elements known or to become known.

It will be understood that the claims are intended to cover all changes and modifications of the preferred embodiments of the invention, herein chosen for the purpose of illustration which do not constitute departures from the spirit and scope of the invention.

What is claimed is:

1. In a fluorescent display device of the type having a vitreous substrate, a concave glass cover plate having a sealing perimeter surface for sealing to said substrate, electrical elements on said substrate, and a meltable glass seal sealing said sealing perimeter surface to said substrate sealably enclosing said electrical elements within a sealed enclosure; the improvement comprising:
   (a) said meltable glass seal containing from about 20 to about 60 percent lead and a trace of metallic nucleating agent;
   (b) a substantially transparent conductive coating of metallic oxide on at least part of the inside surface of said glass cover plate; and
   (c) said transparent conductive coating continuing through said seal between the inside and the outside of said sealed enclosure.

2. The apparatus recited in claim 1 further comprising said metallic nucleating agent being selected from the group consisting of zinc and titanium.

3. The apparatus recited in claim 1 or 2 further comprising the metal in said metal oxide being selected from the group consisting of tin, indium and antimony.

4. The apparatus recited in claim 3 further comprising contact means external to said sealed enclosure for making electrical contact with enclosure whereby the conductive coating inside said sealed enclosure is electrically connected to said contact means by the conductive coating continuing through said seal between the inside and outside of said sealed enclosure, said conductive coating having thickness in the area continuing through said seal greater than or equal to the thickness of the coating inside said sealed enclosure.

5. The apparatus recited in claim 4 wherein said contact means comprises:
   (a) said conductive coating being coated on an external surface of said cover plate outside said sealed enclosure;
   (b) a contact piece in electrical contact with the conductive coating on the external surface; and
   (c) the conductive coating on said external surface being electrically continuous with the conductive coating continuing through the seal and therethrough with the conductive coating inside said sealed enclosure.

6. A fluorescent display device comprising:
   (a) a substrate
   (b) a plurality of elements on said substrate;
   (c) a concave cover plate sealed by a seal at its perimeter to said substrate and forming with said substrate a sealed enclosure containing said plurality of elements;
   (d) a layer of transparent conductive metal oxide on the inside surface of said cover plate, said metallic oxide being chosen from the group consisting of the oxides of tin indium and antimony;
   (e) a seal-piercing portion of said layer continuing through said seal to outside said sealed enclosure, said seal-piercing portion being of thickness greater than or equal to that of said layer on the inside surface of said cover plate; and
   (f) contact means external to said sealed enclosure for electrically contacting part of said layer outside said sealed enclosure and wherein electrical connection is made through said seal to the layer inside said cover plate solely through said seal piercing portion of said layer of transparent conductive metal oxide.

7. The apparatus recited in claim 6 further comprising:
   (a) said layer being at least first and second areas inside said sealed enclosure; and
   (b) said at least first and second areas and their associated seal-piercing portions and contact means being electrically isolated from each other whereby the voltages on said first and second areas may be controlled independently of each other.

8. The apparatus recited in claim 7 further comprising:
   (a) said plurality of elements being at least first and second characters;
   (b) said first area facing and being at least coextensive with said first character;
   (c) said second area facing and being at least coextensive with said second character.

9. The apparatus recited in claim 6 further comprising:
   (a) a second layer of transparent conductive metal oxide on the outside of said cover plate opposite at least part of said layer inside said sealed enclosure; and
   (b) said second layer being insulated from said layer.

10. The apparatus recited in claim 6 further comprising at least part of said layer being in electrical contact with at least one of said elements.

11. The fluorescent display device recited in claim 1 further comprising:
   (a) said extended flange with said coating thereon forming the male portion of connecting means; and
   (b) contact piece means for electrically contacting the coating on the surface of said extended flange which faces said substrate.

12. The fluorescent display device of claim 6 wherein said sealing surface is a flange on said cover plate and at least a portion of said flange extends outward substantially beyond the perimeter of said substrate whereby an extended flange is formed.

* * * * *